(12) United States Patent
Chae et al.

(10) Patent No.: US 11,433,375 B2
(45) Date of Patent: Sep. 6, 2022

(54) PHOTOCATALYTIC CARBON FILTER

(71) Applicants: University of Cincinnati, Cincinnati, OH (US); University of Sydney, Camperdown (AU)

(72) Inventors: Soryong Chae, Cincinnati, OH (US); Tahereh Noeiaghaei, Victoria Park (AU); Yoontaek Oh, Cincinnati, OH (US)

(73) Assignees: UNIVERSITY OF CINCINNATI, Cincinnati, OH (US); UNIVERSITY OF SYDNEY, Wales (AU)

( * ) Notice: Subject to any disclaimer, the term of this patent is extended or adjusted under 35 U.S.C. 154(b) by 351 days.

(21) Appl. No.: 16/471,131

(22) PCT Filed: Dec. 19, 2017

(86) PCT No.: PCT/US2017/067204
§ 371 (c)(1),
(2) Date: Jun. 19, 2019

(87) PCT Pub. No.: WO2018/118851
PCT Pub. Date: Jun. 28, 2018

(65) Prior Publication Data
US 2020/0038840 A1 Feb. 6, 2020

Related U.S. Application Data

(60) Provisional application No. 62/435,940, filed on Dec. 19, 2016.

(51) Int. Cl.
*B01J 21/18* (2006.01)
*B01J 21/06* (2006.01)
(Continued)

(52) U.S. Cl.
CPC .......... *B01J 21/185* (2013.01); *B01J 21/063* (2013.01); *B01J 35/004* (2013.01);
(Continued)

(58) Field of Classification Search
CPC .... B01J 21/185; B01J 21/063; B01J 35/0013; B01J 35/004; B01J 35/1071;
(Continued)

(56) References Cited

U.S. PATENT DOCUMENTS 6,027,775 A * 2/2000 Kasuga .................... A61K 8/02
428/34.1
8,987,164 B2 * 3/2015 Kang .................. H01L 21/0228
502/182

(Continued)

FOREIGN PATENT DOCUMENTS

| CN | 10 3469284 | * 12/2013 | ............ C25D 11/26 |
| EP | 1061041 A1 | 12/2000 | |
| WO | 2010126686 A2 | 11/2010 | |

OTHER PUBLICATIONS

Jung Eun Park et al., "Electrophoretic Deposition of Carbon Nanotubes over TiO2 Nanotubes: Evaluation of Surface Properties and Biocompatibility." Bioinorganic Chemistry and Applications, vol. 2014, Article ID 236521, pp. 1-7. (Year: 2014).*
(Continued)

*Primary Examiner* — Patricia L. Hailey
(74) *Attorney, Agent, or Firm* — Dinsmore & Shohl (57) ABSTRACT

Provided herein are photocatalytic carbon filters for the removal impurities such as microorganisms, organic compounds, algal toxins, and their degradation by-products from water and wastewater. The photolytic carbon filters comprise a porous titanium substrate comprising $TiO_2$ nanotube arrays and multi-wall carbon nanotubes disposed on the $TiO_2$ nanotube arrays. Also provided herein are methods of
(Continued)

manufacture and methods of use of the disclosed photocatalytic carbon filters.

11 Claims, 5 Drawing Sheets

(51) Int. Cl.
   *B01J 35/00* (2006.01)
   *B01J 35/10* (2006.01)
   *B01J 37/34* (2006.01)
   *C02F 1/00* (2006.01)
   *C02F 1/32* (2006.01)

(52) U.S. Cl.
   CPC ....... *B01J 35/0013* (2013.01); *B01J 35/1071* (2013.01); *B01J 35/1076* (2013.01); *B01J 37/348* (2013.01); *C02F 1/001* (2013.01); *C02F 1/32* (2013.01)

(58) Field of Classification Search
   CPC .. B01J 35/1076; B01J 37/348; B01J 20/3295; B01J 20/3441; C02F 1/001; C02F 1/32; C02F 1/288; C02F 2305/08; C02F 2305/10
   USPC ...... 502/182, 350; 427/122, 255.23, 255.28; 977/752, 811, 814, 843, 891
   See application file for complete search history.

(56) References Cited

U.S. PATENT DOCUMENTS

| | | | | |
|---|---|---|---|---|
| 9,796,121 | B2* | 10/2017 | Shanov | C23C 14/35 |
| 2002/0049134 | A1* | 4/2002 | Imazato | H01M 12/06 |
| | | | | 502/101 |
| 2005/0092804 | A1* | 5/2005 | Yu Chen | B65H 35/0066 |
| | | | | 225/93 |
| 2007/0253889 | A1* | 11/2007 | Awano | D01F 9/1272 |
| | | | | 423/447.3 |
| 2009/0175757 | A1* | 7/2009 | Yao | B01D 69/141 |
| | | | | 422/4 |
| 2009/0186214 | A1* | 7/2009 | Lafdi | B82Y 30/00 |
| | | | | 428/336 |
| 2010/0068461 | A1* | 3/2010 | Wallace | B81C 1/00111 |
| | | | | 428/156 |
| 2010/0213046 | A1 | 8/2010 | Grimes et al. | |
| 2010/0320089 | A1* | 12/2010 | Misra | C25D 11/26 |
| | | | | 205/109 |
| 2011/0194990 | A1* | 8/2011 | Hsu | B82Y 30/00 |
| | | | | 422/211 |
| 2012/0012177 | A1* | 1/2012 | Muduli | B82Y 40/00 |
| | | | | 136/256 |
| 2014/0113127 | A1* | 4/2014 | Tominaga | H01B 13/0036 |
| | | | | 428/323 |
| 2015/0218013 | A1 | 8/2015 | Ahmad et al. | |
| 2015/0233010 | A1* | 8/2015 | Pan | H01M 4/0471 |
| | | | | 205/322 |

OTHER PUBLICATIONS

Seul Gi Seo et al., "Temperature-dependent charge transport in TiO2-multiwalled carbon nanotube composites." Carbon, 67, pp. 688-693. (Year: 2014).*

S. Murgolo et al., "UV and solar-based photocatalytic degradation of organic pollutants by nano-sized TiO2 grown on carbon nanotubes." Catalysis Today, 240, pp. 114-124. (Year: 2015).*

Balazs Reti et al., "Substrate dependent photocatalytic performance of TiO2/MWCNT photocatalysts." Applied Catalysis A: General, 469, pp. 153-158. (Year: 2014).*

Qiao Zhang et al., "TiO2 nanotube-carbon macroscopic monoliths with multimodal porosity as efficient recyclable photocatalytic adsorbents for water purification." Materials Chemistry and Physics, 173, pp. 452-459. (Year: 2016).*

Junhan Kong et al., "Preparation and photocatalytic activity of carbon coating TiO2 nanotubes." Superlattices and Microstructures, 89, pp. 252-258. (Year: 2016).*

International Search Report & Written Opinion of corresponding PCT Application No. PCT/US2017/067204 dated Mar. 5, 2018.

Mohammed Alsawat et al, Synthesis of Carbon Nanotube-Nanotubular Titania Composites by Catalyst-Free CVC Process: Insights into the Formation Mechanism and Photocatalytic Properties; ACS Applied Materials and Interfaces, Nov. 20, 2015, No. 7, 28361-28368.

Zohreh R. Hesabi et al, Self-Standing Crystalline TiO2 Nanotubes/ CNTs Heterojunction Membrane: Synthesis and Characterization; ACS Applied Materials and Interfaces, Mar. 22, 2011, No. 3, 952-955.

* cited by examiner

PHOTOCATALYTIC CARBON FILTER

RELATED APPLICATIONS

This application claims the benefit under 35 U.S.C. § 119(e) to U.S. Provisional Application Ser. No. 62/435,940, filed Feb. Dec. 19, 2016, the entire disclosure of which is incorporated herein by this reference.

TECHNICAL FIELD

The subject matter of this application relates to photocatalytic carbon filters. More specifically, the presently disclosed photocatalytic carbon filters comprises $TiO_2$ nanotube arrays and carbon nanotubes for filtration of both water and wastewater.

BACKGROUND

Water demand has increased as a result of population and economic growth, while water resources have remained relatively constant or even decreased due to water pollution and contamination, the persistent over-drafting of aquifers, and adverse changes in the patterns of precipitation occurred in some areas. Trace organic compounds such as phenolic compounds, pharmaceuticals and personal care products, endocrine disrupting compounds, and cyanotoxins in water sources have been recognized as significant global problems in water supply. Conventional low pressure driven membranes do not remove these organic compounds effectively.

For enhanced removal of those compounds from water, various advanced oxidation processes such as photolysis, ozonation, photocatalysis, ultrasound, and wet air oxidation have been explored. Many of these methods are cost-effective to install but expensive to operate, often due to the cost of reagents and energy requirements for operating the systems.

Engineered nanomaterials have been explored for numerous applications including industrial separations, water and wastewater treatment, chemical synthesis, energy generation, ground water remediation, and air quality control. Among engineered nanomaterials, carbon nanotubes are known for their unique properties, such as superior electron conduction, high surface area, and high adsorption capacity.

Carbon nanotubes have been widely studied as an adsorbent for removal of various organic compounds such as phenols, polycyclic aromatic hydrocarbons, heavy metals, and trace organic compounds. While engineered nanomaterials dispersed in aqueous suspensions are desirable for providing high surface area in photocatalytic reactions, post-separation or recovery of the nanoparticles after use remains a major challenge. One approach to minimize the post-separation processes is to stabilize the engineered nanomaterials by immobilization on suitable support materials.

In previous studies, carbon nanotube buckypapers were developed for enhanced removal of humic acid (HA) from water. Yang, et al., *Removal of natural organic matter in water using functionalised carbon nanotube buckypaper*, Carbon 59:160-66, (2013). Carboxylic and hydroxyl functional groups increased the hydrophilicity of the carbon nanotubes and exhibited excellent removal of HA (>93%). However, the mechanical strength of the buckypaper is not high and its application is largely limited under high pressure condition (>1 bar).

$TiO_2$ nanotube arrays have shown promise in the photocatalytic removal of water impurities. Noeiaghaei, et al., *The influence of geometrical characteristics on the photocatalytic activity of TiO2 nanotube arrays for degradation of refractory organic pollutants in wastewater*, Water Sci. & Tech. 71(9): 1301-09 (2015). However, use of $TiO_2$ nanotube arrays in degradation of certain water impurities produces undesirable by-products in treated water, such as 4-chlorophenyl and hydroxylated phenol compounds.

A need persists for durable, effective water filtration devices capable of removing microorganisms, organic compounds, and harmful algal toxins from water, as well as any harmful by-products produced by photocatalytic degradation.

SUMMARY

Provided herein are photocatalytic carbon filters comprising both $TiO_2$ nanotube arrays and multi-wall carbon nanotubes and methods of their manufacture for enhanced removal of impurities from water and wastewater.

In one embodiment, a photocatalytic carbon filter is provided, comprising a porous titanium substrate comprising $TiO_2$ nanotube arrays; and multi-wall carbon nanotubes disposed on the porous titanium substrate.

In another embodiment, a method of making a photocatalytic carbon filter is provided, the method comprising forming $TiO_2$ nanotube arrays from a titanium substrate by anodic oxidation; and growing multi-wall carbon nanotubes on the $TiO_2$ nanotube arrays by thermal chemical vapor deposition.

In another embodiment, a method of removing water impurities and degradation by-products is provided, the method comprising: providing a photocatalytic carbon filter comprising: a porous titanium substrate comprising $TiO_2$ nanotube arrays and multi-wall carbon nanotubes disposed on the $TiO_2$ nanotube arrays; and passing water through the photocatalytic carbon filter under environmental conditions selected from the group consisting of solar irradiation, ultraviolet irradiation, and combinations thereof, whereby the water impurities are degraded under the environmental conditions and degradation by-products are trapped in the photocatalytic carbon filter, thereby removing the water impurities and the degradation by-products from the water.

All references (e.g., printed publications such as books, papers, patents, patent applications, catalogs, databases) are incorporated herein by reference in their entirety. In the event of a conflict or inconsistency, the present specification, as modified by any amendments thereto, shall control.

These and other embodiments will be more clearly understood by reference to the detailed disclosure and accompanying figures.

BRIEF DESCRIPTION OF THE FIGURES

The embodiments set forth in the figures are illustrative and exemplary in nature and not intended to limit the subject matter defined by the claims. The following detailed description of the illustrative embodiments can be understood when read in conjunction with the following drawings, wherein:

DETAILED DESCRIPTION

Unless otherwise defined, all technical and scientific terms used herein have the same meaning as commonly understood by one of ordinary skill in the art to which this invention pertains. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "and combinations thereof" means a combination including at least one of the foregoing elements.

Scientific and technical terms used herein are intended to have the meanings commonly understood by those of ordinary skill in the art. Such terms are found defined and used in context in various standard references illustratively including J. Sambrook and D. W. Russell, Molecular Cloning: A Laboratory Manual, Cold Spring Harbor Laboratory Press; 3rd Ed., 2001; F. M. Ausubel, Ed., Short Protocols in Molecular Biology, Current Protocols; 5th Ed., 2002; B. Alberts et al., Molecular Biology of the Cell, 4th Ed., Garland, 2002; D. L. Nelson and M. M. Cox, Lehninger Principles of Biochemistry, 4th Ed., W. H. Freeman & Company, 2004; Wild, D., The Immunoassay Handbook, 3rd Ed., Elsevier Science, 2005; Gosling, J. P., Immunoassays: A Practical Approach, Practical Approach Series, Oxford University Press, 2005; Antibody Engineering, Kontermann, R. and Dübel, S. (Eds.), Springer, 2001; Harlow, E. and Lane, D., Antibodies: A Laboratory Manual, Cold Spring Harbor Laboratory Press, 1988; Ausubel, F. et al., (Eds.), Short Protocols in Molecular Biology, Wiley, 2002; J. D. Pound (Ed.) Immunochemical Protocols, Methods in Molecular Biology, Humana Press; 2nd ed., 1998; B. K. C. Lo (Ed.), Antibody Engineering: Methods and Protocols, Methods in Molecular Biology, Humana Press, 2003; and Kohler, G. and Milstein, C., Nature, 256:495-497 (1975); the contents of each of which are incorporated herein by reference.

As used herein, the term "nanotube" refers to a nanotube-scale tube-like structure. Nanotubes can be formed from a variety of materials, including carbon, boron, silicon, titanium, and the like. Nanotubes exhibit many thermal and electrical properties that are desirable for applications in energy, healthcare, electronics, and environmental treatment.

As used herein, the term "nanotube arrays" refers to a plurality of vertically-aligned nanotubes oriented along their longitudinal axes normal to a substrate surface.

As used herein, the term "multi-wall carbon nanotube" refers to allotropes of carbon with a multi-layer cylindrical nanostructure that has hexagonal graphite molecules attached at the edges. Multi-wall carbon nanotubes comprise concentric cylindrical nanostructures.

Anodic oxidation refers to electrochemical methods for the production of an oxide film on a metallic substrate.

Thermal chemical vapor deposition refers to a synthesis method whereby a substrate is placed in a heated atmosphere (typically 600-800° C.) and exposed to one or more volatile precursors, which react or decompose on the surface of the substrate to produce a deposit.

The term "degradation by-products" refers to materials that are produced as a direct result of a desired reaction, which appear as part of a fully balanced chemical equation.

Unless otherwise indicated, all numbers expressing quantities used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Photocatalytic Carbon Filters and Methods of Manufacture

The photocatalytic carbon filters disclosed herein comprise (1) a porous titanium substrate comprising $TiO_2$ nanotube arrays and (2) multi-wall carbon nanotubes disposed on the porous titanium substrate. In a specific embodiment, the multi-wall carbon nanotubes are grown on the surface of the $TiO_2$ nanotube arrays to provide a photocatalytic carbon filter comprising a plurality of layers—a $TiO_2$ nanotube layer, and a multi-wall carbon nanotube layer. Accordingly, the photocatalytic carbon filter degrades water impurities upon exposure to solar and/or UV irradiation and simultaneously traps any degradation by-products by virtue of the carbon nanotube layer.

A photocatalytic carbon filter as disclosed herein is manufactured by first forming $TiO_2$ nanotube arrays from a titanium substrate by anodic oxidation, and then growing multi-wall carbon nanotubes on the $TiO_2$ nanotube arrays by thermal chemical vapor deposition.

Methods of anodic oxidation are known in the art. See, for example, Yun, et al., *Sodium fluoride-assisted modulation of anodized $TiO_2$ nanotube for dye-sensitized solar cells application, ACS Applied Mat. & Interfaces* 3(5): 1585-93 (2011); and Noeiaghaei, et al., *The influence of geometrical characteristics on the photocatalytic activity of TiO2 nanotube arrays for degradation of refractory organic pollutants*

*in wastewater*, Water Sci. & Tech. 71(9): 1301-09 (2015). In certain embodiments, anodic oxidation is carried out in a cell comprising an anode and a cathode, wherein the anode is a titanium substrate, such as a titanium foil. The anode, or titanium foil, is immersed in an electrolyte solution containing potassium fluoride (KF) or sodium fluoride (NaF), and then an electrical potential is applied on each of the anode and cathode to form $TiO_2$ nanotube arrays from the titanium substrate. Various cathode materials are suitable for use, including platinum sheets, stainless steel, carbon materials, nickel alloys, and the like. In certain embodiments, a programmable direct current (DC) power supply is interfaced with a computer to provide the electrical potential whereby $TiO_2$ nanotube arrays are formed from the titanium substrate. Anodic oxidation of the titanium foil produces a porous titanium substrate comprising $TiO_2$ nanotube arrays. The $TiO_2$ nanotube arrays are then calcinated by methods known in the art. In one embodiment, the $TiO_2$ nanotube arrays are calcinated at 450° C. for about 3 hours with a ramp rate of 5° C./min.

The formation of $TiO_2$ nanotube arrays from Ti substrates occurs via simultaneous reactions of electrochemical etching (i.e., field-enhanced dissolution of $Ti^{4+}$ ions and $TiO_2$ formation) and chemical dissolution by F ions. The skilled artisan will appreciate that nanotube length and diameter may be modified by adjusting the applied potential and anodization time. In certain embodiments, the $TiO_2$ nanotube diameter, or pore size, ranges from about 0.2 to about 2.5 μm.

Multi-wall carbon nanotubes are grown directly on the $TiO_2$ nanotube arrays by thermal chemical vapor deposition, whereby the multi-wall carbon nanotubes are chemically bonded to the $TiO_2$ nanotube arrays. Methods of manufacturing carbon nanotubes are known in the art. See, for example, Yang, et al., *Removal of natural organic matter in water using functionalised carbon nanotube buckypaper*, Carbon 59:160-66, (2013). In certain embodiments, thermal chemical vapor deposition is carried out in a horizontal dual-zone reactor. A catalyst is provided in a first zone of the dual-zone reactor, and the substrate (i.e., porous titanium substrate comprising $TiO_2$ nanotube arrays) is placed in the second zone of the dual-zone reactor. The system is flushed with argon gas to remove oxygen, and then temperature is increased in each of the first and second zones. A carbon source gas and a reducing agent gas are passed through the reactor, thereby growing multi-wall carbon nanotubes on the surface of the substrate (i.e., on the $TiO_2$ nanotube arrays).

The dual-zone reactor advantageously permits growth of multi-wall carbon nanotubes directly on the surface of the porous titanium substrate comprising $TiO_2$ nanotube arrays. The catalyst in the first zone of the reactor is evaporated under heat and carried with the gas flow to the second zone, where catalyst ions deposit directly on the surface of the $TiO_2$ nanotube arrays. Gas flow rates are controlled to effectuate deposition of catalyst ions on the surface of the $TiO_2$ nanotube arrays, thereby permitting growth of multi-wall carbon nanotubes directly on the surface thereof.

Figure 1:
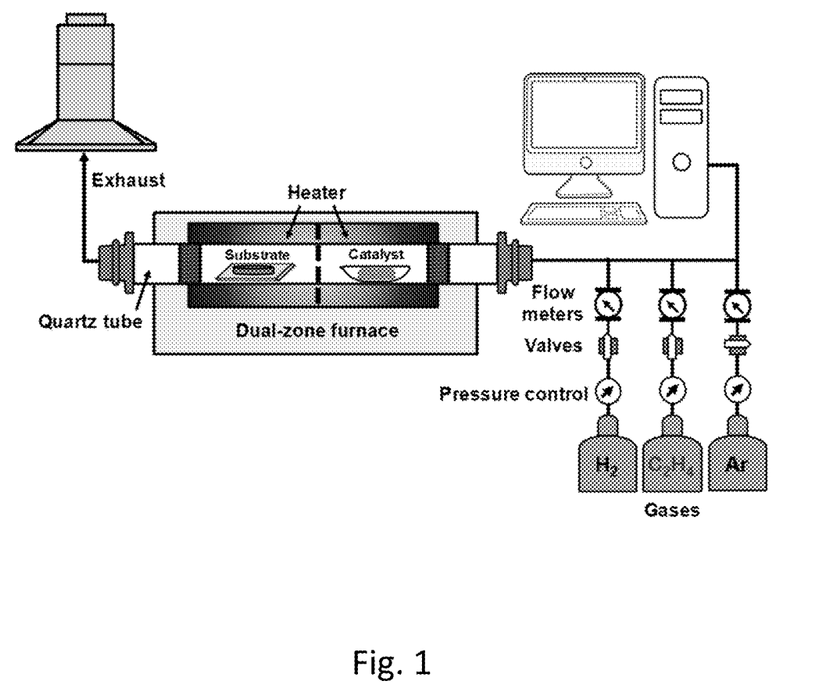
FIG. 1 shows a schematic diagram of a thermal chemical vapor deposition system for synthesis of photocatalytic carbon filters.

The skilled artisan will appreciate that the reactor can be configured in a variety of ways to achieve the desired results. FIG. 1 shows an exemplary dual-zone reactor for use in the presently disclosed methods. In certain embodiments, the reactor comprises a quartz cylinder having an inner diameter of from abut 4.5 to about 10 cm and a length of about 150 cm.

Various reagents are suitable for use in the thermal chemical vapor deposition methods described herein. Suitable catalysts include, for example, ferrocene and iron pentacarbonyl. In a specific embodiment, the catalyst is ferrocene, which is decomposed to form iron particles.

Argon gas is flushed through the reactor to remove oxygen prior to the thermal chemical vapor deposition. In certain embodiments, the dual-zone reactor is first flushed with argon gas at a higher flow rate, and then the flow rate is reduced during the chemical vapor deposition process. In a specific embodiment, the argon gas is first flushed through the system at a flow rate of about 600 sccm for about 10 min, after which the flow rate is reduced to about 167 sccm for the duration of the reaction. Other suitable gases include nitrogen and helium.

Suitable carbon source gases include, for example, $C_2H_4$, acetylene, and ethanol. In a specific embodiment, the carbon source gas is $C_2H_4$. The carbon source gas is passed through the reactor at a flow rate of about 115 standard cubic centimeters per minute (sccm).

In a specific embodiment, the reducing gas is $H_2$. The reducing gas is passed through the reactor at a flow rate of about 400 sccm.

Temperature is ramped up in each of the first and second zones of the reactor to effectuate the chemical vapor deposition. In one embodiment, temperature in the first zone comprising the catalyst is increased to about 250° C. at a rate of 3° C./min. In another embodiment, temperature in the second zone comprising the titanium substrate is increased to about 770° C. at a rate of 10° C./min.

Modifying Hydrophilicity of Photocatalytic Carbon Filters

The photocatalytic carbon filters disclosed herein have a hydrophobic surface. In certain embodiments, it is desirable to further modify the surface of the photocatalytic carbon filters to increase hydrophilicity. Increasing hydrophilicity increases water permeability through the photocatalytic carbon filters, thereby increasing speed of filtration through the filters.

Hydrophilicity can be increased by immersing the photocatalytic carbon filter in an acidic solution, or by passing an acidic solution through the filter. In this way, hydrophilic functional groups become bonded to the titanium substrate, $TiO_2$ nanotubes, and/or multi-wall carbon nanotubes.

In certain embodiments, the photocatalytic carbon filter is treated with a solution comprising a mixture of $H_2SO_4$ and $HNO_3$. Treatment results in bonding of carboxylic and hydroxyl functional groups to the photocatalytic carbon filter surfaces, thereby increasing hydrophilicity. In certain embodiments, the photocatalytic carbon filter is immersed in the treating solution at a temperature of about 60° C. for at least 60 minutes.

Other suitable reagents for increasing hydrophilicity include atmospheric pressure helium/oxygen plasma. Treatment plasma exposure time and power can vary from one to 30 min and 10 to 200 W, respectively.

Methods of Use

The photocatalytic carbon filters disclosed herein are useful in methods of degrading water and wastewater impurities and contaminants and removing the degradation by-products thereof. In certain embodiments, a method of removing water impurities and degradation by-products is provided, comprising: providing a photocatalytic carbon filter comprising a porous titanium substrate comprising $TiO_2$ nanotube arrays and multi-wall carbon nanotubes disposed on the $TiO_2$ nanotube arrays, and passing water through the photocatalytic carbon filter under environmental conditions which permit photocatalysis of water impurities. Specifically, water impurities are degraded as they pass through the filter under environmental conditions selected from the group consisting of solar irradiation, ultraviolet radiation, and combinations thereof. Any degradation by-products resulting therefrom are then captured by the multi-wall carbon nanotubes, such that filtered water is substantially free of impurities and degradation by-products.

The photocatalytic carbon filters disclosed herein are useful in treating surface water as well as wastewater, and combinations thereof. The filters and methods disclosed herein effectively remove a variety of impurities and/or contaminants from water, including but not limited to: microorganisms such as bacteria and other single-cell microbes; organic compounds such as chlorobenzoic acids and phenolic compounds; harmful algal toxins, such as cyanotoxins; and combinations thereof.

The following Examples are set forth to illustrate particular embodiments of the invention and should not be construed as limiting the full scope of the invention as defined by the claims and understood by a person of skill in the art.

EXAMPLES

Example 1

Manufacture of $TiO_2$ Nanotube Arrays $TiO_2$ nanotube arrays were synthesized by anodic oxidation of a Ti porous sheet (Ti>99%, thickness=1 mm, pore size 0.2-2.5 µm) (Changsheng Titanium Co., Ltd, China) in a fluorinated solution of ethylene glycol containing 0.5 wt % NaF and 5 wt % water (Yun, et al., *Sodium fluoride-assisted modulation of anodized $TiO_2$ nanotube for dye-sensitized solar cells application*, ACS Applied Mat. & Interfaces 3(5): 1585-93 (2011)). Prior to anodization, the Ti sheets were decontaminated by immersing in acetone and ethanol for 15 minutes, rinsing with ultrapure water, and vacuum drying. Anodization was carried out in a one compartment cell with two electrodes comprised of platinum (Pt) sheet (cathode) and Ti sheet (anode). A programmable direct current (DC) power supply interfaced with a computer was used to provide electrical potential of 60-80V on both electrodes over 1-5 hours. Then, the resultant $TiO_2$ nanotube arrays were subjected to calcination at 450° C. for 3 hours with a ramp rate of 5° C./min.

Example 2

Manufacture of Photocatalytic Carbon Filter

Multi-wall carbon nanotubes were grown on the Ti porous sheet (Ti>99%, thickness=1 mm, pore size=0.2-2.5 µm) (Changsheng Titanium Co., Ltd., China) containing $TiO_2$ nanotube arrays via thermal chemical vapor deposition. As shown in FIG. 1, the procedure was carried out in a horizontal hot wall dual-zone reactor at ambient pressure, as described in Yang, et al., *Removal of natural organic matter in water using functionalised carbon nanotube buckypaper*, Carbon 59:160-66, (2013). Briefly, the horizontal reactor consisted of a 150-cm long quartz tube with an inner diameter of 4.5 cm. $C_2H_4$ and $H_2$ were utilized as a carbon source and a reducing agent, respectively. Ferrocene catalyst (25-100 mg) was placed in a ceramic boat, and introduced into the first zone of the reactor.

The reactor was first flushed with argon (Ar) gas at a flow-rate of 600 standard cubic centimeters per minute (sccm) for 10 min in order to flush away any oxygen in the reactor and then the Ar flow-rate was reduced to 167 sccm. In the meantime, the temperature of the first and the second zones of the reactor were increased to 250° C. (with a ramp of 3° C./min) and 770° C. (with a ramp of 10° C./min), respectively. Afterwards, $C_2H_4$ and $H_2$ with a flow rate of 115 and 400 sccm were passed through the reactor for 5 min.

The photocatalytic carbon filters synthesized according to these methods have a hydrophobic surface. To increase hydrophilicity of the surface, the filters was treated using a mixture of $H_2SO_4$ (0.5 N) and $HNO_3$ (1 N) at temperature of 60° C. for at least 60 min. Increasing hydrophilicity of the photocatalytic carbon filters increases water permeability through the filters and results in more rapid water filtration.

Example 3

Characteristics of Photocatalytic Carbon Filters

Surface characteristics of the photocatalytic carbon filters were characterized by field-emission scanning electron microscopy (FESEM) with energy dispersion of X-ray (EDX) (Hitachi S4500) operating at accelerated voltage of 15 kV without any coating. Diameter of the multi-wall carbon nanotubes was measured using transmission electron microscope (TEM) (JEOL 1400). Hydrophobicity of the filters was studied using a drop shape tensiometer (KRUSS-DSA25). The contact angle formed by a water droplet (~3 µl) on the disc surface was measured in triplicate.

Figure 4:
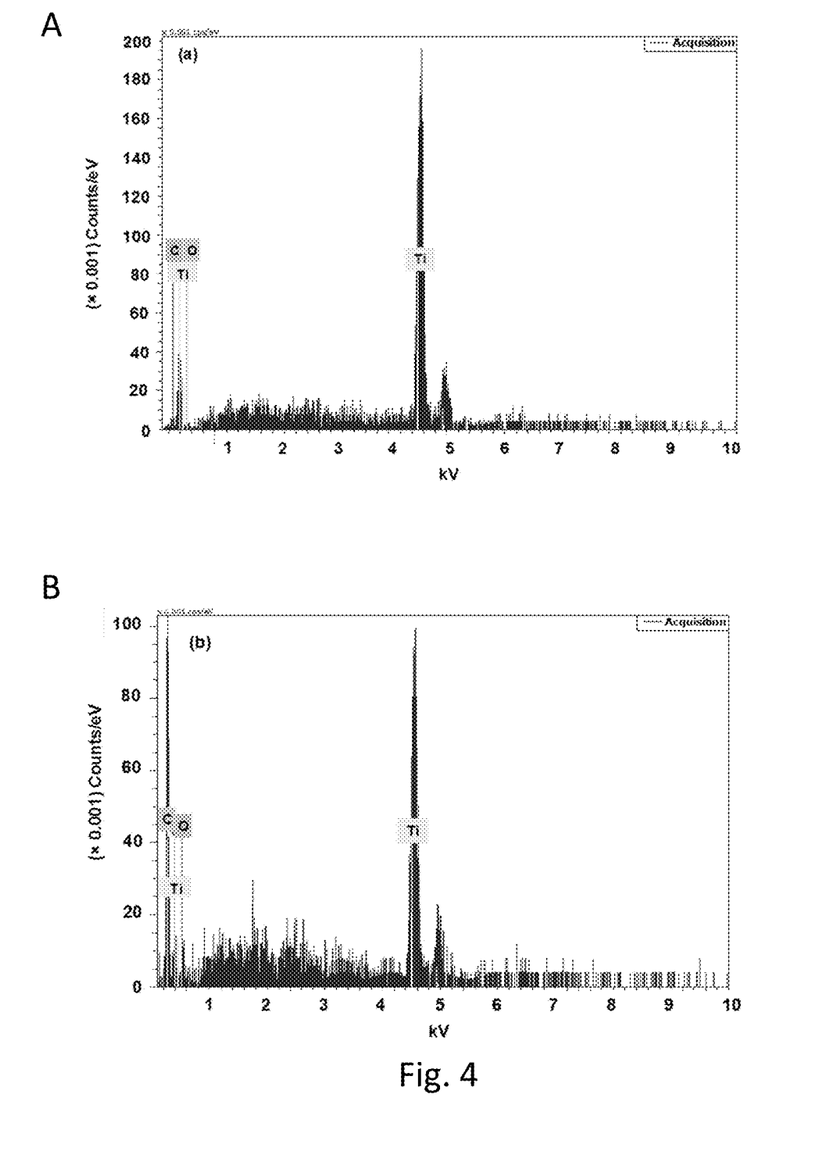
FIG. 4 shows SEM-EDX analysis of the porous titanium substrate comprising $TiO_2$ nanotube arrays (FIG. 4(A)) and the photocatalytic filter comprising both $TiO_2$ nanotube arrays and multi-wall carbon nanotubes (FIG. 4(B)) synthesized with 50 mg ferrocene.

As summarized in Table 1, the diameter and content of multi-wall carbon nanotubes increased from 25.4 to 54.2 nm and 2.1 to 8.6 mg/cm² as the dosage of ferrocene increased from 25 mg to 100 mg, respectively. SEM images (FIGS. 3 (A)-(F)) and EDX analysis (FIG. 4(A)-(B)) also confirmed those changes. Also, water contact angle (i.e., hydrophobicity) of the PCFs increased from 118° C. to 138° C. as the content of carbon nanotubes increased from 2.1 to 8.6 mg/cm²:

TABLE 1

Structural characteristics of the photocatalytic carbon filters (PCF) synthesized with various amounts of ferrocene.

| Sample | Ferrocene dosage (mg) | MWCNT content (mg/cm²) | Contact angle (°) | Diameter (nm) |
|---|---|---|---|---|
| PCF 1 | 25 | 2.1 | 118 | 25.4 |
| PCF 2 | 50 | 5.0 | 120 | 38.0 |
| PCF 3 | 100 | 8.6 | 138 | 54.2 |

Example 4

Filtration Performance of Photocatalytic Carbon Filters

Figure 2:
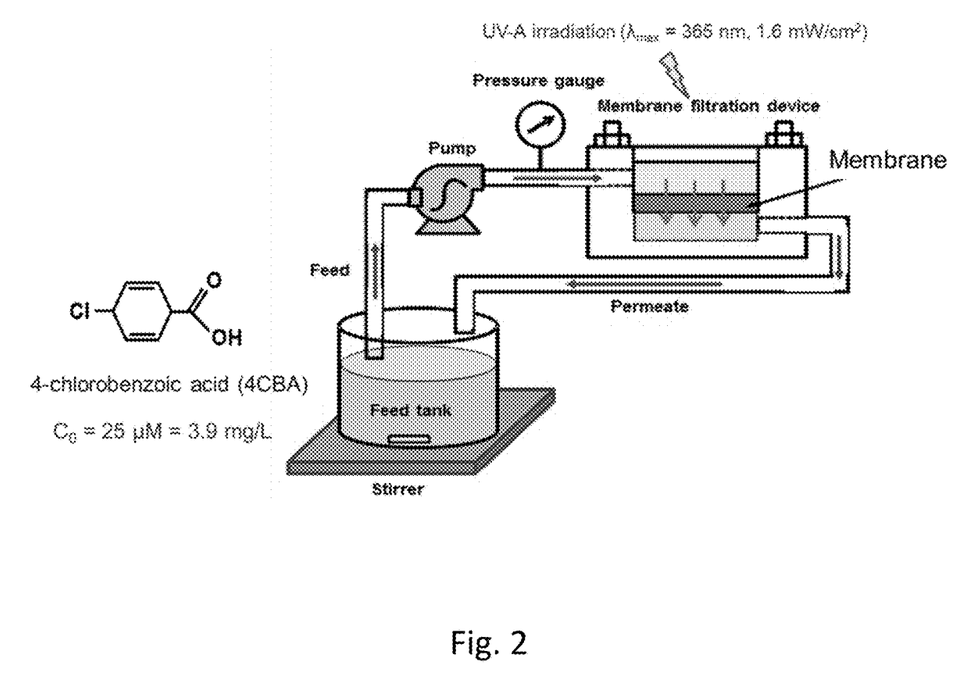
FIG. 2 shows a schematic diagram of a closed-loop continuous filtration system.
Figure 3:
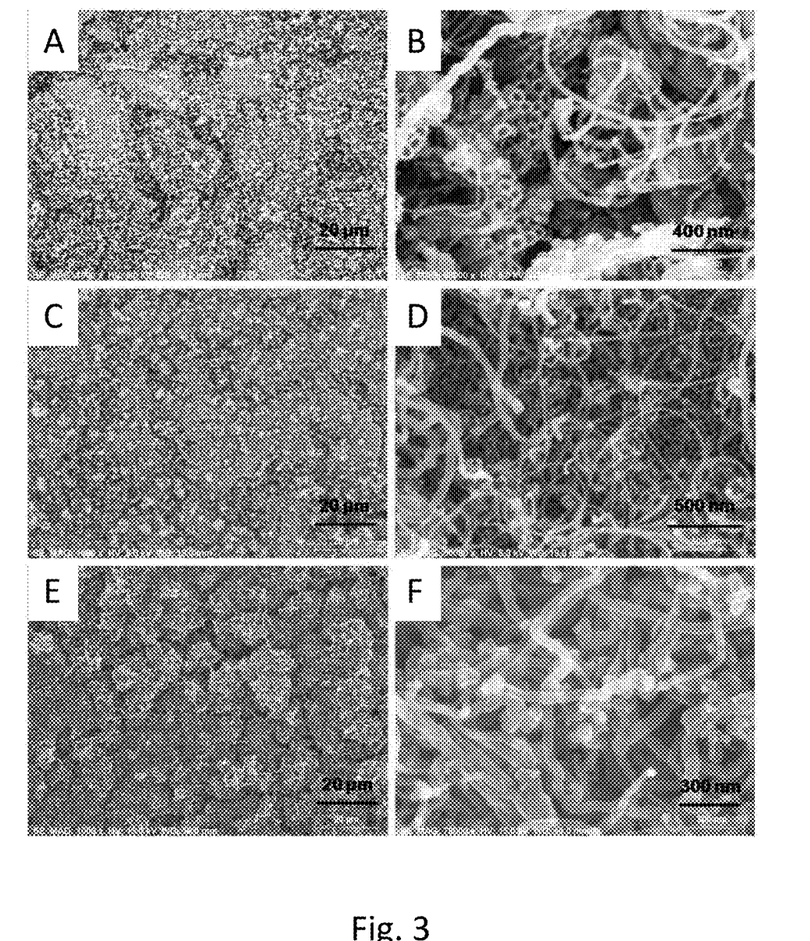
FIG. 3 shows surface morphology of the photocatalytic carbon filters synthesized with varying amounts of ferrocene. Surface morphology is shown for 25 mg ferrocene (FIGS. 3(A) and 3(B)); 50 mg ferrocene (FIGS. 3(C) and 3(D)); and 100 mg ferrocene (FIGS. 3(E)) and 3(F)).

Filtration performance of the photocatalytic carbon filters (diameter 25 mm) was evaluated in a closed-loop continuous filtration system, as shown in FIG. 2. Flow rate of the feed was maintained at 0.5 ml/min. In this study, 4CBA ($ClC_6H_4CO_2H$, $M_w$=156.57 g/mol, $pK_a$=4.03) (Sigma-Aldrich) was used as a model organic compound. The experiments were carried out for 3 h. Average rejection efficiency of 4CBA by the PCFs as calculated as:

$$R(\%) = \left(1 - \frac{C_f}{C_i}\right) \times 100$$

where R is the removal efficiency (%), $C_i$ is the initial concentration (mg/L) of 4CBA in the feed, and $C_f$ is the final concentration (mg/L) of 4CBA in the membrane permeate. All experiments were performed in triplicate. One millilitre of the sample solution was collected from the feed tank every 30 minutes. The concentration of the model compound (i.e., 4CBA) was analyzed using a high-performance liquid chromatography (HPLC) equipped with a ZORBAX Eclipse XBD-C18 analytical column (2.1×150 mm, 5 μm, Agilent). Student's t-test was used to assess the significance of the results employing a 95% confidence interval.

As shown in Table 2, as the content of multi-wall carbon nanotubes increased from 2.1 to 8.6 mg/cm$^2$, and water permeability (L/m$^2$/h/bar, LMH/bar) decreased from 11.1 to 5.5 LMH/bar possibly due to the increase in surface hydrophobicity of the photocatalytic carbon filters. However, the removal efficiency of 4CBA by adsorption increased from 5 to 7% as the content of multi-wall carbon nanotubes increased from 2.1 to 8.6 mg/cm$^2$. The improved adsorption efficiency could be a result of the increased surface area by introducing more multi-wall carbon nanotubes.

TABLE 2

Removal efficiency of 4CBA by the photocatalytic carbon filters (PCF).

| Sample | MWCNT content (mg/cm$^2$) | Removal of 4CBA by adsorption (%) | Water permeability (LMH/bar) |
| --- | --- | --- | --- |
| PCF 1 | 2.1 | 5 | 11.1 |
| PCF 2 | 5.0 | 6 | 9.5 |
| PCF 3 | 8.6 | 7 | 5.5 |

Example 5

Modifying Surface Hydrophilicity

One approach to increase the adsorption efficiency and water permeability of the photocatalytic carbon filters is surface modification through a hydrophilic treatment. In a previous study (Yang, et al.), the introduction of carboxylic and hydroxyl functional groups to the surface of carbon nanotubes significantly increased the hydrophilicity and exhibited excellent removal of HA (>93%). In this study, the acid treatment using H$_2$SO$_4$ (0.5 N) and HNO$_3$ (1 N) was applied for a filter (6.4 mg/cm$^2$) to increase hydrophilicity of the surface.

Figure 5:
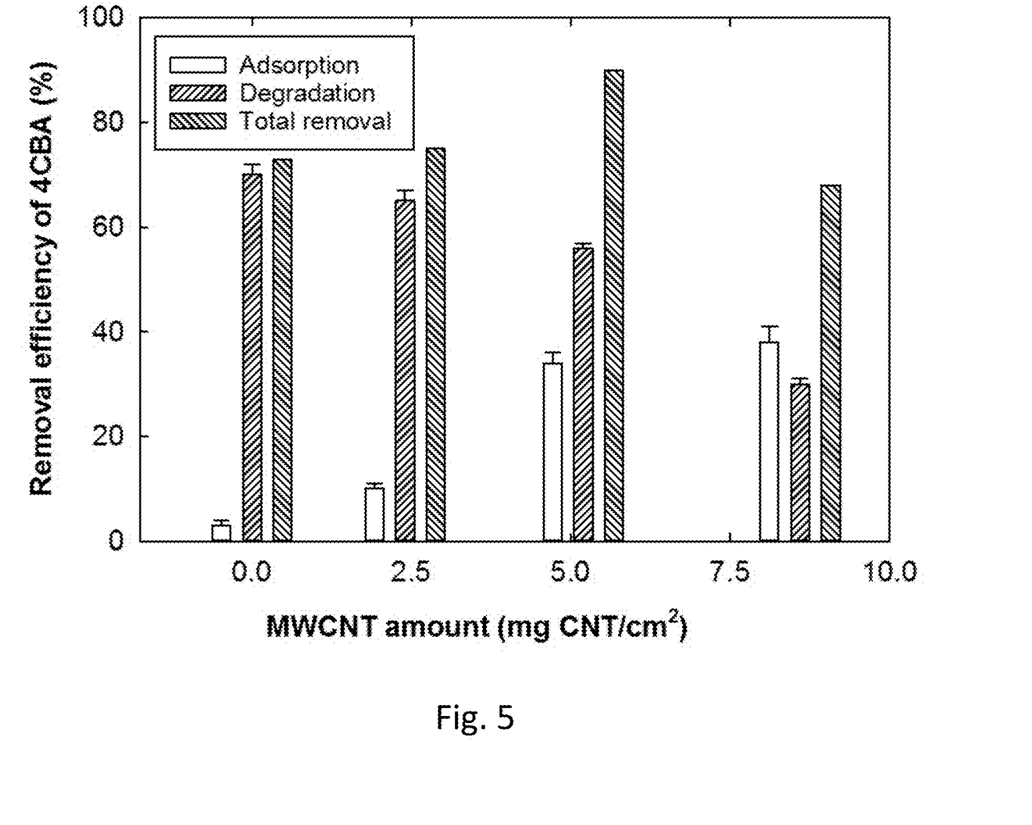
FIG. 5 is a graph showing removal efficiency of 4CBA by the hydrophilically-modified photocatalytic carbon filters.

As shown in FIG. 5, the hydrophilically modified multi-wall carbon nanotube filters (MWCNTs) could remove 73-90% of 4CBA (25 μM) by adsorption and photocatalytic degradation over 50 LMH/bar.

Example 6

Removal of Cyanotoxins Using Photocatalytic Carbon Filters

Cyanobacteria, or blue-green algae, are photosynthetic and microscopic organisms found in most bodies of water that can multiply to form harmful algal blooms under favorable conditions such as high nutrient concentrations, strong sunlight, and high temperature. The increasing occurrence of harmful algal blooms in lakes and rivers has become an emerging concern threatening human and environmental health because certain cyanobacteria can produce and release potent cyanotoxins such as microcystins (MCs), cylindrospermopsin (CYN), saxitoxin (SXT), and anatoxin-a (ANTX-a) in sources of drinking water supply, causing undesirable taste and odor in water and illness or skin irritation in pets, livestock, and humans. Table 3 shows chemical properties of select cyanotoxins.

TABLE 3

Chemical properties of various cyanotoxins in freshwaters.

| Cyanotoxin | Molecular mass (g/mole) | pKa |
| --- | --- | --- |
| MC-LR (C$_{49}$H$_{74}$N$_{10}$O$_{12}$) | 995.19 | 2.18 (pH = 1)/−1.76 (pH = 10) |
| CYN (C$_{15}$H$_{21}$N$_5$O$_7$S) | 415.43 | 8.80 |
| SXT (C$_{10}$H$_{17}$N$_7$O$_4$) | 299.29 | 8.22 |
| ANTX-a (C$_{10}$H$_{15}$NO) | 165 | 9.36 |

Removal efficiencies of cyanotoxins by adsorption using a commercially available nanofiltration membrane (Molecular weight cut-off=300 Da, Dow Filmtec) and the present photocatalytic carbon filter (MWCNT of 25 mg) were compared. Results show that relatively large cyanotoxins such as MC-LR and CYN are effectively removed by both the polymeric nanofiltration membrane and the photocatalytic carbon filter. However, relatively small cyanotoxins such as SXT and ANTX-a are rarely removed by the polymeric nanofiltration membrane. As shown in Table 4, the photocatalytic carbon filter achieved better removal efficiencies of the relatively small cyanotoxins compared to the polymeric nanofiltration membrane, even at about 10 times faster water flux.

TABLE 4

Removal efficiencies of cyanotoxins by adsorption using a commercially available nanofiltration membrane and a photocatalytic carbon filter

| | Polymeric nanofiltration membrane | Photocatalytic carbon filter |
| --- | --- | --- |
| Material | Polyamide | MWCNTs (25 mg) |
| *Removal (%) of MC-LR | >97 | >97 |
| *Removal (%) of CYN | 90.5 | >99 |
| *Removal (%) of SXT | <1 | 78.5 |
| *Removal (%) of ANTX-a | <1 | 47.1 |
| Water Permeability (LMH/bar) | 2.7 | 60.3 |

*Initial concentration of cyanotoxins = 10 μg/L.

Various modifications of the present disclosure, in addition to those shown and described herein, will be apparent to those skilled in the art of the above description. Such modifications are also intended to fall within the scope of the appended claims. It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular embodiments of the disclosure, but is not meant to be a limitation upon the practice thereof. The following claims, including all equivalents thereof, are intended to define the scope of the disclosure.

What is claimed:

1. A photocatalytic carbon filter comprising:
a porous titanium substrate comprising $TiO_2$ nanotube arrays; and
multi-wall carbon nanotubes grown on a surface of the porous titanium substrate and chemically bonded thereto.

2. The photocatalytic carbon filter of claim 1, wherein the porous titanium substrate comprises pores having a diameter of from about 0.2 to about 2.5 μm.

3. The photocatalytic carbon filter of claim 1, further comprising hydrophilic functional groups bound to at least one of the porous titanium substrate or multi-wall carbon nanotubes.

4. The photocatalytic carbon filter of claim 3, wherein the hydrophilic functional groups are selected from the group consisting of hydroxyl groups, carboxylic groups, and combinations thereof.

5. The photocatalytic carbon filter of claim 1, wherein the multi-wall carbon nanotubes extend vertically from $TiO_2$ nanotube arrays on the porous titanium substrate.

6. The photocatalytic carbon filter of claim 1, wherein the multi-wall carbon nanotubes are of at least 25.4 nm in diameter.

7. The photocatalytic carbon filter of claim 1, wherein the multi-wall carbon nanotubes are of less than 54.2 nm in diameter.

8. The photocatalytic carbon filter of claim 1, wherein the multi-wall carbon nanotubes are present at a content of at least 2.1 $mg/cm^3$.

9. The photocatalytic carbon filter of claim 1, wherein the multi-wall carbon nanotubes are present at a content of less than 8.6 $mg/cm^3$.

10. The photocatalytic carbon filter of claim 1, wherein the multi-wall carbon nanotubes have a water contact angle of at least 118°.

11. The photocatalytic carbon filter of claim 1, wherein the multi-wall carbon nanotubes have a water contact angle of less than 138°.

* * * * *